US012762931B2

(12) United States Patent
Charest et al.

(10) Patent No.: US 12,762,931 B2
(45) Date of Patent: Oct. 13, 2026

(54) LOTTERY GAMING SYSTEM, METHODS OF OPERATING LOTTERY GAMING SYSTEMS, AND LOTTERY TICKETS

(71) Applicant: Brightstar Global Solutions Corporation, Providence, RI (US)

(72) Inventors: Joseph Charest, Attleboro, MA (US); Sarah Walker, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 384 days.

(21) Appl. No.: 18/349,385

(22) Filed: Jul. 10, 2023

(65) Prior Publication Data

US 2025/0022349 A1 Jan. 16, 2025

(51) Int. Cl.
*G07F 17/32* (2006.01)

(52) U.S. Cl.
CPC ........ *G07F 17/329* (2013.01); *G07F 17/3244* (2013.01)

(58) Field of Classification Search
CPC ........................... G07F 17/3244; G07F 17/329
See application file for complete search history.

(56) References Cited

U.S. PATENT DOCUMENTS

| | | | |
|---|---|---|---|
| 5,116,049 A | 5/1992 | Sludikoff et al. | |
| 6,773,345 B2 | 8/2004 | Walker et al. | |
| 7,740,243 B1 | 6/2010 | Kean | |
| 8,272,936 B2 | 9/2012 | Walker et al. | |
| 8,348,743 B2 | 1/2013 | Walker et al. | |
| 10,713,900 B2 | 7/2020 | Heathcote et al. | |
| 10,896,582 B2 | 1/2021 | Heathcote et al. | |
| 11,682,268 B2 | 6/2023 | Heathcote et al. | |
| 2003/0114210 A1 | 6/2003 | Meyer et al. | |
| 2005/0075158 A1 | 4/2005 | Walker et al. | |
| 2005/0107153 A1 | 5/2005 | Jubinville et al. | |
| 2006/0247008 A1 | 11/2006 | Walker et al. | |
| 2007/0191086 A1 | 8/2007 | Huang | |
| 2010/0185523 A1 | 7/2010 | Tulley et al. | |
| 2011/0201401 A1* | 8/2011 | Kumbhat ............ | G07F 17/3295 463/17 |
| 2013/0337883 A1 | 12/2013 | Stanek et al. | |

OTHER PUBLICATIONS

North Carolina Education Lottery Policies and Procedures Manual, Chapter 2—Game Rules, 2.04J—Sum It Up™, Feb. 24, 2013.
Win Sum Cash, Wisconsin Lottery Ticket, available before the priority date of this patent application.

* cited by examiner

*Primary Examiner* — Robert E Mosser
(74) *Attorney, Agent, or Firm* — Neal, Gerber & Eisenberg LLP

(57) ABSTRACT

A lottery gaming system and method providing a play of a multi-draw lottery game, that includes a selection of a player multi-draw sum that is for at least one drawings of at least one draw lottery game, and a determination of any awards based on the player multi-draw sum and a sum of the plurality of drawn numbers for the drawing(s) of the draw lottery game that is/are used for the multi-draw lottery game.

20 Claims, 8 Drawing Sheets

FIG. 3
400
LOTTERY TICKET
PRINTED ON MONDAY JUNE 26, 2023 16:44:35 ET
PLAYER-SELECTED SUM FOR 2 DRAW GAMES
420
40
TOTAL WAGER: $5.00
430

750

| Winning Sum Range | Odds | Prize |
|---|---|---|
| 5 – 9 | 1 in 6,027 | $20,000 |
| 10 – 14 | 1 in 405 | $1,400 |
| 15 – 19 | 1 in 79 | $285 |
| 20 – 24 | 1 in 25 | $90 |
| 25 – 29 | 1 in 11.4 | $40 |
| 30 – 34 | 1 in 6.8 | $25 |
| 35 – 45 | 1 in 2.4 | $9 |
| 46 – 50 | 1 in 6.8 | $25 |
| 51 – 55 | 1 in 11.4 | $40 |
| 56 – 60 | 1 in 25 | $90 |
| 61 – 65 | 1 in 79 | $285 |
| 66 – 70 | 1 in 405 | $1,400 |
| 71 – 75 | 1 in 6,027 | $20,000 |

FIG. 6C

LOTTERY GAMING SYSTEM, METHODS OF OPERATING LOTTERY GAMING SYSTEMS, AND LOTTERY TICKETS

CROSS-REFERENCE TO RELATED APPLICATIONS

This application is related to the following commonly owned co-pending patent application: U.S. application Ser. No. 18/349,377, entitled "LOTTERY GAMING SYSTEM, METHODS OF OPERATING LOTTERY GAMING SYSTEMS, AND LOTTERY TICKETS".

BACKGROUND

The present disclosure relates to lottery gaming systems, methods of operating lottery gaming systems, and lottery tickets for plays of lottery games.

Lottery gaming systems may enable a player to select one or more numbers for a lottery ticket, randomly select winning drawn lottery numbers, and if the winning drawn lottery numbers match the player-selected numbers, provide the player an award associated with the player-selected numbers.

BRIEF SUMMARY

In various embodiments, the present disclosure relates to a method of operating a lottery gaming system including a processor and a memory device that stores a plurality of instructions executable by the processor, wherein the method includes: determining, via the processor, a player multi-draw sum for a play of a multi-draw lottery game, the player multi-draw sum including one of a plurality of different sums based on numbers that are selectable for each of a plurality of drawings of a draw lottery game that are used for the multi-draw lottery game; generating, via the processor, a lottery ticket including an indication of the player multi-draw sum; storing data associated with the lottery ticket; causing the lottery ticket to be provided to a player, the lottery ticket including a player multi-draw sum portion including an indication of the player multi-draw sum for the play of the multi-draw lottery game; for each of a plurality of independent and separate drawings of the draw lottery game that are used for the play of the multi-draw lottery game, determining a quantity of drawn numbers for that drawing of the draw lottery game from a plurality of different numbers, the quantity of drawn numbers being at least one; determining an award for the lottery ticket based on the player multi-draw sum and a total sum of the drawn numbers for all of the plurality of drawings of the draw lottery game that are used for the multi-draw lottery game; and causing a display, by a display device remote from the processor, of an indication of the award.

In various other embodiments, the present disclosure relates to a method of operating a lottery gaming system including a processor and a memory device that stores a plurality of instructions executable by the processor, wherein the method includes: determining, via the processor, a player multi-draw sum for a play of a multi-draw lottery game, the player multi-draw sum including one of a plurality of different sums that are based on a drawing of a first draw lottery game and a drawing of a different second draw lottery game that are used for the multi-draw lottery game; generating, via the processor, a lottery ticket including an indication of the player multi-draw sum; storing data associated with the lottery ticket; causing the lottery ticket to be provided to a player, the lottery ticket including a player multi-draw sum portion including an indication of the player multi-draw sum for the play of the multi-draw lottery game; for each of independent and separate drawings of the first draw lottery game and the second draw lottery game that are used for the play of the multi-draw lottery game, determining drawn numbers for that drawing of the draw lottery game; determining an award for the lottery ticket based on the player multi-draw sum and a sum of all of the drawn number for the drawings of the first draw lottery game and the second draw lottery game that are used for the multi-draw lottery game; and causing a display, by a display device remote from the processor, of an indication of the award.

In various other embodiments, the present disclosure relates to a method of operating a lottery gaming system including a processor and a memory device that stores a plurality of instructions executable by the processor, wherein the method includes: determining a player multi-draw sum for a play of a multi-draw lottery game, the player multi-draw sum including one of the plurality of different sum ranges; generating a lottery ticket including an indication of the player multi-draw sum including one of the sum ranges; storing data associated with the lottery ticket; causing the lottery ticket to be provided to a player, the lottery ticket including an indication of an indication of the player multi-draw sum for the play of the multi-draw lottery game; for each of a plurality of independent and separate drawings of the draw lottery game that are used for the play of the multi-draw lottery game, determining a quantity of drawn numbers for that drawing of the draw lottery game from the plurality of different number, the quantity of drawn numbers being more than one; determining an award for the lottery ticket based on the player multi-draw sum and a total sum of the drawn numbers for all of the drawings of the draw lottery game that are used for the play of the multi-draw lottery game; and causing a display, by a display device remote from the processor, of an indication of the first award and the second award.

Additional features are described in, and will be apparent from, the following Detailed Description and the figures.

BRIEF DESCRIPTION OF THE SEVERAL VIEWS OF THE DRAWINGS

FIG. 6C is an example paytable for the play of the multi-draw lottery game for the lottery ticket of FIG. 6A.

DETAILED DESCRIPTION

Figure 1:
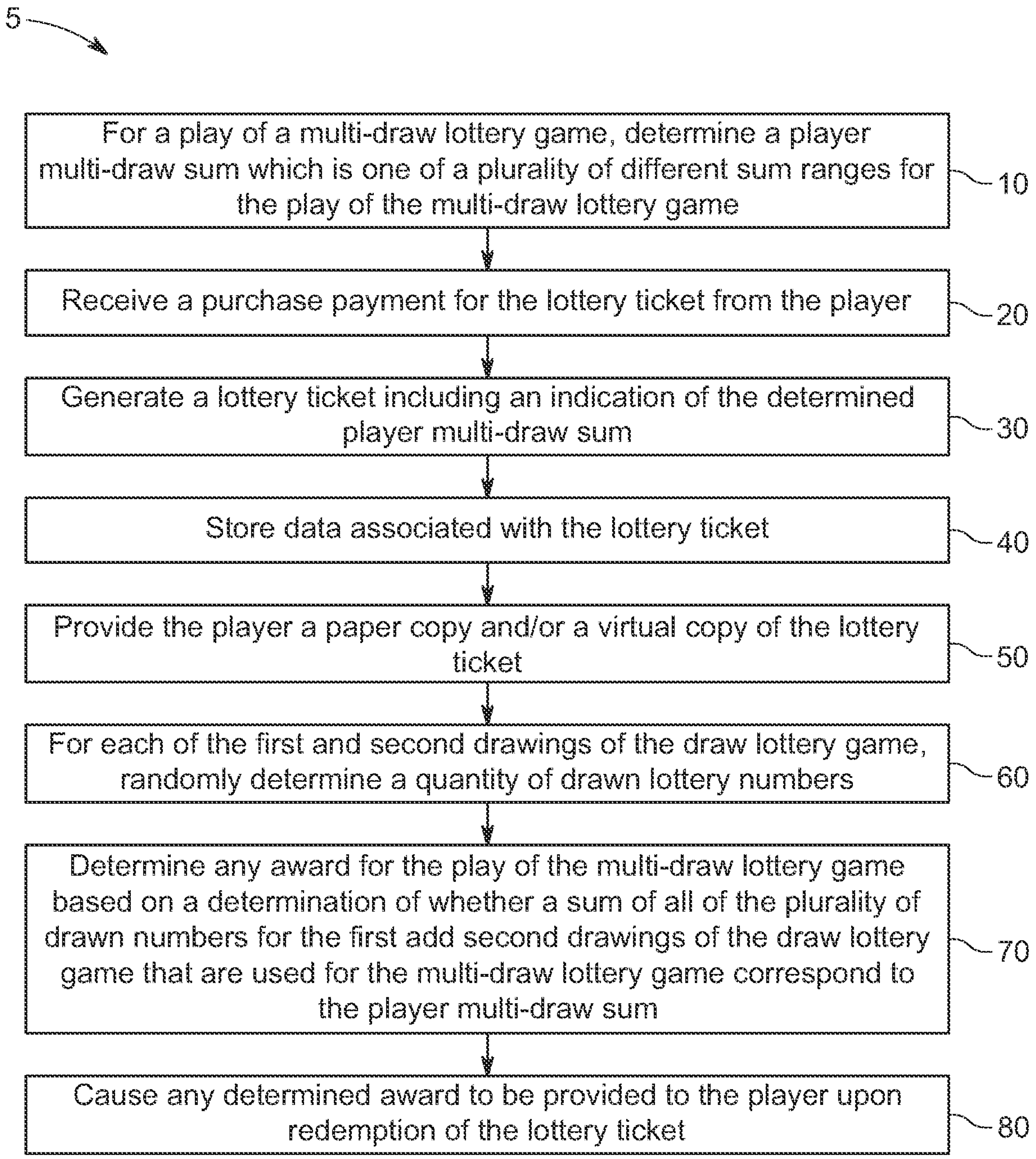
FIG. 1 is a flow chart of a method for operating a lottery gaming system of one example embodiment of the present disclosure.

In various embodiments, the present disclosure relates to lottery gaming systems and methods of operating lottery gaming systems that provide plays of a multi-draw lottery game. In various embodiments, for each play of the multi-draw lottery game, the lottery gaming system and method provide a player selection of a player multi-draw sum (that can be an exact sum or a sum range) that is for the play of the multi-draw lottery game, and a determination of any awards based on whether the player multi-draw sum corresponds to a sum of all of the drawn numbers of one or more drawings for one or more draw lottery games that are used for the multi-draw lottery game.

In various embodiments, the lottery gaming system and method enable a player to purchase a lottery ticket for the play of the multi-draw lottery game without purchasing any play(s) of the draw lottery game(s) that is/are used for of the multi-draw lottery game.

In various embodiments, the lottery gaming system and method enable a player to purchase a lottery ticket for the play(s) of any of the draw lottery games without any play of the multi-draw lottery game.

In various embodiments, the lottery gaming system and method enable a player to purchase a lottery ticket including a play of the multi-draw lottery game only if the player also purchases play(s) of the draw lottery game(s) that is/are used for the multi-draw lottery game.

In various embodiments, the lottery gaming system and method enable a player to purchase a lottery ticket including play(s) of the draw lottery game(s) only if the player also purchases a play of the multi-draw lottery game.

In various embodiments, the play of the multi-draw lottery game is based on a single drawing for a draw lottery game.

In various embodiments, the play of the multi-draw lottery game is based on multiple drawings for the same draw lottery game.

In various embodiments, the play of the multi-draw lottery game is based on multiple sequential drawings of the same draw lottery game.

In various embodiments, the play of the multi-draw lottery game is based on single drawings of different draw lottery games.

In various embodiments, the play of the multi-draw lottery game is based on multiple drawings of different draw lottery games.

In various embodiments, each of the draw lottery games include a plurality of different numbers, and the multi-draw lottery game includes sums based on the same plurality of different numbers.

In various embodiments, for the play of the multi-draw lottery game, the selected player multi-draw sum can be a sum range. In various embodiments, this sum range can be any range of different numbers, wherein the range is based on: (1) a minimum sum of the numbers that can be selected in all of the drawings of the draw lottery games that are used for the play of the multi-draw lottery game; and (2) a maximum sum of the numbers that can be selected in all of the drawings of the draw lottery games that are used for the play of the multi-draw lottery game. For example, if the draw lottery games are two drawings of the pick 3 lottery game, then the minimum sum of the numbers is 0 (i.e., 0+0+0 for the first pick 3 draw lottery game plus 0+0+0 for the second pick 3 draw lottery game) and the maximum sum of numbers is 54 (i.e., 9+9+9 for the first pick 3 draw lottery game plus 9+9+9 for the second pick 3 draw lottery game). Thus, in various embodiments, the gaming system and method can enable the player, for the play of the multi-draw lottery game, to select the player multi-draw sum to be a sum range selected from various different possible ranges of the sums 0 to 54. For example, the gaming system and method can enable the player, for the play of the multi-draw lottery game, to select any of the player multi-draw sum ranges of 0-10, 10-20, 20-30, 30-40, 40-50, or 50-54. The possible sum ranges will thus depend on the quantity of drawings of the draw lottery games and the numbers that can be drawn in each such draw lottery game. In various embodiments, the gaming system and method can provide a suitable paytable based on the odds of matching the sum range. It should be appreciated that various sum ranges can be obtained by different combinations of numbers from these drawings of these draw lottery games. It should also be appreciated that the present disclosure contemplates that: (1) the selectable sum ranges can be pre-determined; (2) the selectable sum ranges can be pre-determined, and all be of the same range variance; (3) the selectable sum ranges can be pre-determined and two or more can be of different range variances; or (4) the sum range can be determined by the player. It should also be appreciated that the sum range can includes non-consecutive sets of numbers such as 40, 42, 46, 44, and 48.

In various other embodiments, for the play of the multi-draw lottery game, the selected player multi-draw sum can be an exact sum (i.e., a single number). In various embodiments, this exact sum can be any number in a range of different numbers, wherein the range is based on: (1) a minimum sum of the numbers that can be selected in all of the drawings of the draw lottery games that are used for the play of multi-draw lottery game; and (2) a maximum sum of the numbers that can be selected in all of the drawings of the draw lottery games that are used for the play of multi-draw lottery game. For example, if the draw lottery games are two drawings of the pick 3 draw lottery game, then the minimum sum of the numbers is 0 (i.e., 0+0+0 for the first pick 3 draw lottery game plus 0+0+0 for the second pick 3 draw lottery game), and the maximum sum of numbers is 54 (i.e., 9+9+9 for the first pick 3 draw lottery game plus 9+9+9 for the second pick 3 draw lottery game). Thus, in various embodiments, the gaming system and method can enable the player, for the play of the multi-draw lottery game, to select the player multi-draw sum to be an exact sum (i.e., a single number) from 0 to 54. In such embodiments, the gaming system and method can provide a suitable paytable based on the odds of matching the exact sum. It should be appreciated that except for the lowest and highest sum, each of the exact sums can be obtained by different combinations of numbers from these plays of these draw lottery games.

In various embodiments, the determined player multi-draw sum for the play of the multi-draw lottery game is selected by the player. In various embodiments, the determined player multi-draw sum for the play of the multi-draw lottery game is randomly selected by the lottery system. In various embodiments, the determined player multi-draw sum for the play of the multi-draw lottery game is randomly selected by the lottery system at the request of the player (such as via a quick pick).

In various example embodiments, the lottery gaming system determines any award for the play of the multi-draw lottery game based on a sum of all numbers for all of the drawings of the draw lottery game(s) that are used for the multi-draw lottery game and the player multi-draw sum.

In various embodiments, the lottery gaming system can determine and provide an award for the multi-draw game based an exact match of the player multi-draw sum and the sum of all the drawn lottery numbers for all the drawings of the draw lottery game(s) that are used for the multi-draw lottery game.

In various embodiments, the lottery gaming system can determine and provide an award for the multi-draw game based the sum of all the drawn lottery numbers for all the drawings of the draw lottery game(s) that are used for the multi-draw lottery game being within the range of the player multi-draw sum.

In various example embodiments, the quantity of the drawings of the draw lottery game(s) that is used for the multi-draw lottery game is one.

In various example embodiments, the quantity of the drawings of the draw lottery games that are used for the multi-draw lottery game is two and the draw lottery games are the same (such as a same pick 4 draw lottery game played twice).

In various example embodiments, the quantity of the drawings of the draw lottery games that are used for the multi-draw lottery game is two and the draw lottery games are different games (such as a pick 3 draw lottery game and a pick 4 draw lottery game).

In various example embodiments, the quantity of the drawings of the draw lottery games that are used for the multi-draw lottery game is more than two and the draw lottery games are the same.

In various example embodiments, the quantity of the drawings of the draw lottery games that are used for the multi-draw lottery game is more than two and two or more of such draw lottery games are different games.

In various example embodiments, the quantity of the drawings of the draw lottery games that are used for the multi-draw lottery game is more than two and all of such draw lottery games are different games.

It should be appreciated that each of the draw lottery games can be any suitable draw lottery game.

It should be appreciated that the award(s) associated with the play of the multi-draw lottery game can be any suitable awards. These awards can be static, in static ranges, in changeable ranges, or otherwise changeable. In various embodiments, the changeable awards can be progressive awards, pari-mutuel awards, or other suitable changeable awards. In various embodiments, the awards can be static or changeable based on the wager level of the player, or otherwise.

FIG. 1 is a flowchart of an example method (indicated by numeral 5) of operating an example lottery gaming system of the present disclosure. In various embodiments, the method 5 is represented by a set of instructions stored in one or more memory devices and executed by one or more processors. Although the method 5 is described with reference to the flowchart shown in FIG. 1, other processes of performing the acts associated with this illustrated example method can be employed. For example, the order of certain of the illustrated blocks and/or diamonds may be changed, certain of the illustrated blocks and/or diamonds may be optional, or certain of the illustrated blocks and/or diamonds may not be employed.

In the embodiments where the lottery ticket only includes a purchase of a play of the multi-draw lottery game (and not any purchase of any drawings of the underlying draw lottery games), the method includes the lottery gaming system: (1) determining a player multi-draw sum for the of the multi-draw game, as indicated by block 10; (2) receiving a purchase payment (that functions as a wager) for the lottery ticket from the player, as indicated by block 20; (3) generating a lottery ticket including an indication of determined player multi-draw sum for the play of the multi-draw lottery game, as indicated by block 30; (4) storing data associated with the lottery ticket, as indicated by block 40; (5) providing the player a paper copy and/or a virtual copy of the lottery ticket, as indicated by block 50; (6) for each of the drawings of the draw lottery games that are used for the multi-draw lottery game, randomly selecting a quantity of drawn lottery numbers, as indicated by block 60; (7) determining any award for the play of the multi-draw lottery game based on a determination of a sum of all of the numbers drawn for the plurality of drawings of the draw lottery games that are used for the multi-draw lottery game and the player multi-draw sum, as indicated by block 10; and (8) causing a payout to the player of any determined award for the lottery ticket, as indicated by block 80. It should be appreciated that in various such example embodiments the determined player multi-draw sum is a single sum for the play of the multi-draw lottery game. It should be appreciated that in various example embodiments the determined player multi-draw sum is a range of sums for the play of the multi-draw lottery game.

1st Example Embodiment

In one example embodiment of the present disclosure, the draw lottery game is a pick 3 draw lottery game, and the multi-draw lottery game includes two sequential drawings of the pick 3 draw lottery game.

In this example embodiment, the lottery gaming system is configured to receive a single player selection of one of the sums 0 through 54 (inclusive of 0 and 54) for the play of the multi-draw lottery game. For example, the player can pick the player multi-draw sum to be 30 or 40.

In this example embodiment, the lottery gaming system is configured to enable the player to use a paper or virtual playslip to select: (1) the play of the multi-draw lottery game; (2) the player multi-draw sum for the play of the multi-draw lottery game; and (3) the wager level (e.g., a wager amount on the play of the multi-draw lottery game), and thus to purchase the lottery ticket. In various other embodiments, the play of the multi-draw lottery game can be made via separate playslips. In various embodiments, the player can purchase also wager on the drawings of the draw lottery games that are used for the play of the multi-draw lottery game via a single playslip or multiple playslips.

Figure 2:
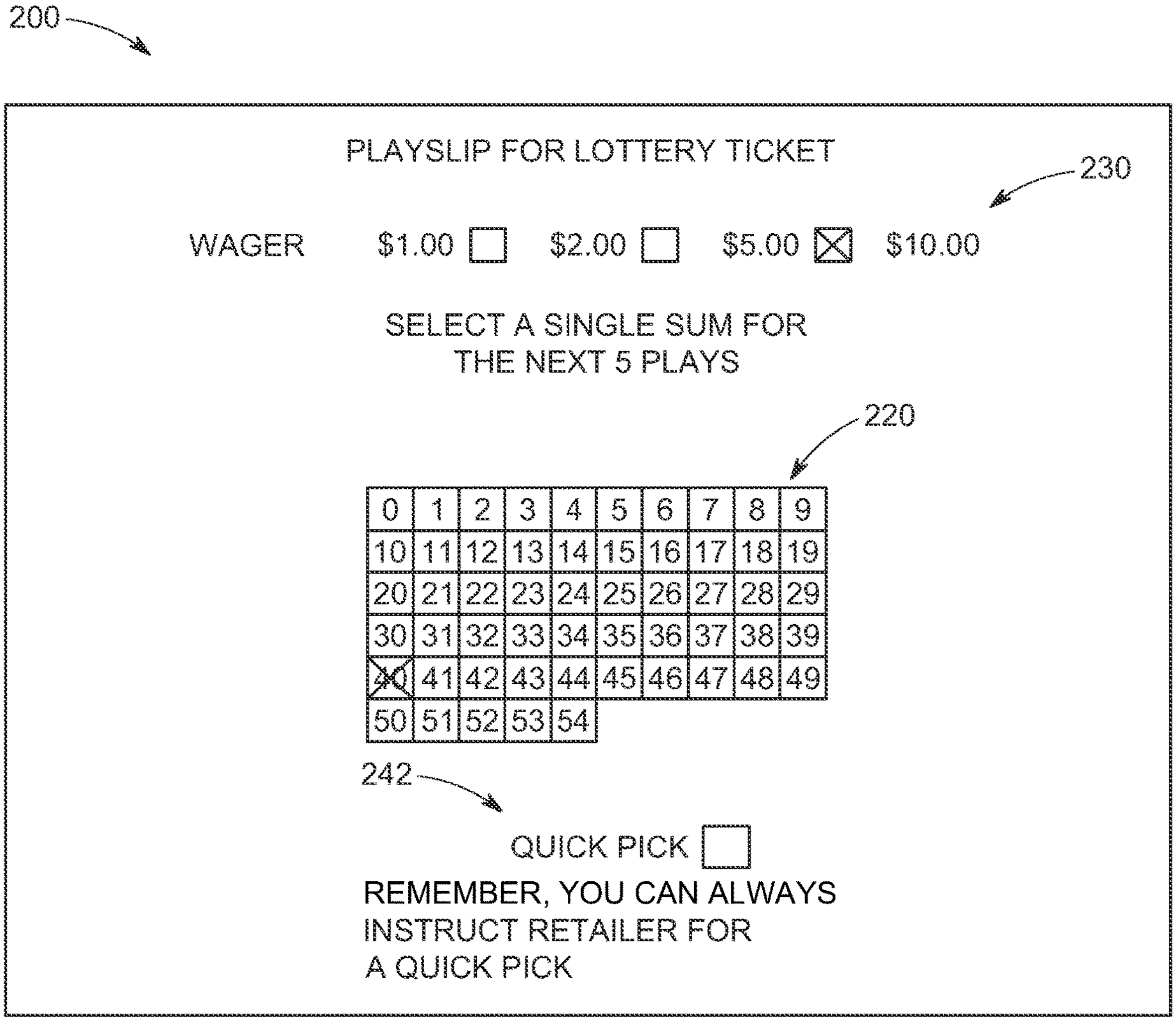
FIG. 2 is a front view of a lottery play slip usable with a lottery system of one example embodiment of the present disclosure.

In the example illustrated embodiment shown in FIG. 2, the lottery gaming system is configured to enable the player to use a paper or virtual playslip to select the player multi-drawn sum, the wager, and to purchase the lottery ticket. FIG. 2 illustrates an example playslip 200. This playslip 200 includes: (1) a player multi-draw sum selection portion 220; (2) a wager indication portion 230; and (3) a quick pick instruction portion 242. That is, instead of the player using the selection portion 220 for the selection of the player multi-draw sum, the player may request the lottery system to randomly select the player multi-draw sum. It should be appreciated that other embodiments of the playslip can include additional or alternative portions and player options and can be arranged in any suitable manner in accordance with the present disclosure.

In this example illustrated embodiment shown in FIG. 2, the player multi-draw sum selection portion 220 of the playslip 200 includes a single set of different player-selectable sums from which the player can select one sum, and particularly a separate individual selectable area for each of the sums 0 through 54 (inclusive of 0 and 54) for the player multi-draw sum. It should be appreciated that while the player multi-draw sum selection portion 220 includes 55 different player-selectable sums, any suitable arrangement of sums can be employed depending on the multi-draw lottery game. As indicated herein, alternative embodiments can include sum ranges instead of exact sums.

As shown in FIG. 2, in this example illustrated embodiment, the player has selected the sum "40" on this playslip 200 to wager on for the play of the multi-draw lottery game. This player-selected sum area is indicated on the draw selection portion 220 by an X indicator associated with the sum 40. It should be appreciated that the player-selected sum may be marked or otherwise indicated in any other suitable manner.

In this example embodiment of FIG. 2, the wager indication portion 230 of the playslip 200 includes a wager entry portion that the player may utilize for selecting a wager on the play of the multi-play lottery game. For example, the player may indicate a wager level of $1, $2, $5, $10, or other such suitable wager on the play of the multi-draw lottery game. In other embodiments, the amount of the wager on the play of the multi-draw lottery game is static (such as $5.00). As shown in FIG. 2, in this example illustrated embodiment, the player has selected the $5.00 wager for the play of the multi-draw lottery game.

In this example embodiment of FIG. 2, the quick pick instruction portion 242 of the playslip 200 includes a message "REMEMBER, YOU CAN ALWAYS INSTRUCT RETAILER FOR A QUICK PICK," that reminds the player they can have the lottery gaming system randomly select the sum for the play of the multi-play draw lottery game. In this example embodiment, the player has selected sum in the sum selection portion 220 of the playslip 200. As such, the player selects their own sum for the play of the multi-draw lottery game.

After making all of the needed player selections on the playslip 200, the lottery gaming system enables the player to purchase a lottery ticket through the lottery gaming system. In various embodiments of the lottery gaming system, the playslip is paper and the player may purchase the lottery ticket via the paper playslip. In various other embodiments of the lottery gaming system, the playslip is virtual and the player may purchase the lottery ticket via the virtual playslip. In various other embodiments, the lottery gaming system is configured to accommodate both paper and virtual playslips.

In various embodiments of the lottery gaming system, the player may purchase the lottery ticket via any suitable manner such as, but not limited to, one of the following: (1) a dedicated lottery kiosk (e.g., a lottery kiosk) configured to communicate over a data network (such as the Internet) to a lottery server (such as a lottery server 606 described below in connection with FIG. 7); (2) a retailer-operated lottery terminal configured to communicate over a data network (such as the Internet) to a lottery server (such as a lottery server 606 described below in connection with FIG. 7); (3) a personal computer configured to communicate over a data network (such as the Internet) to a lottery server (such as a lottery server 606 described below in connection with FIG. 7); and/or (4) a personal mobile device (such as a cellular telephone, tablet, a smart phone, or PDA) configured to communicate over a data network (such as a wireless or cellular data network) to a lottery server (such as a lottery server 606 described below in connection with FIG. 7).

In one such example embodiment, the lottery gaming system enables a player to use a paper playslip to purchase a lottery ticket at a retail location having a lottery terminal configured to receive the playslip and print the lottery ticket at the time of purchase in a conventional manner. In such lottery gaming systems, the retail operator can receive the purchase price for the lottery ticket from the player in a conventional manner.

In another such example embodiment, the lottery gaming system enables a player to use a virtual playslip to purchase a lottery ticket through a retail lottery kiosk configured to display the playslip (as further described below), receive the player number and sum selections using the displayed playslip (as further described below), receive the wager from the player, and print the lottery ticket at the time of purchase. This example lottery kiosk may include an integral printer device and/or be in communication with a printer device for providing a printed lottery ticket to the player.

In another such example embodiment, the lottery gaming system enables a player to use a virtual playslip to purchase a lottery ticket electronically using a personal mobile device such as the player's mobile telephone. In one such embodiment, the lottery gaming system receives from this device the player number and sum selections and the wager from the player, and sends the player a virtual lottery ticket (which in certain instances can be printed by the player using a suitable personal printing device). Thus, it should be appreciated that in various example embodiments, the player may purchase a lottery ticket with a personal mobile device and, thus, may not be provided with a physical (i.e., paper) lottery ticket. Instead, an electronic (or virtual) version of the lottery ticket is provided to the player via, for example, an electronic mail to an email account associated with the player.

Figure 3:
FIG. 3 is a front view of a lottery ticket provided by a lottery system of one example embodiment of the present disclosure.

FIG. 3 illustrates an example lottery ticket 400 that can be issued to a player based on the player multi-draw sum for the play of the multi-draw lottery game, and the respective wager amount. In this example embodiment, the lottery ticket 400 includes a selected player multi-draw sum portion 420, a wager portion 430, and indications of the drawings of the draw lottery games that are used for the play of the multi-draw lottery game. It should be appreciated that in various embodiments, the lottery ticket can display or include additional or alternative information, such as a player identifier, a serial number, the identifies of the draws of the lottery draw games used for the multi-draw lottery game and/or any other relevant information. It should also be appreciated that the lottery ticket provided by the lottery gaming system of the present disclosure may be alternatively configured.

In this example illustrated embodiment, the selected player multi-draw sum portion 420 of the lottery ticket 400 indicates the player multi-draw sum for the play of the multi-draw lottery game. In this example embodiment, the player multi-draw sum is 40.

In this example embodiment, for each lottery ticket purchased, the lottery gaming system creates a data record corresponding to that lottery ticket. For example, when a lottery terminal is used to purchase a lottery ticket, the lottery gaming system creates a data record including suitable information such as but not limited to: (1) a timestamp (date and/or time) associated with when the lottery ticket was purchased; (2) the player multi-draw sum; (3) the player-selected wager amount for the play of the multi-draw lottery game; (4) the lottery ticket identification number; and (5) any other suitable information.

In various example embodiments, this data record is created by the lottery terminal and sent by the lottery terminal to the lottery server (such as described below in connection with the lottery server 606 of FIG. 7). It should be appreciated that the lottery ticket data record can be otherwise suitably created in accordance with the present disclosure.

Figure 4:
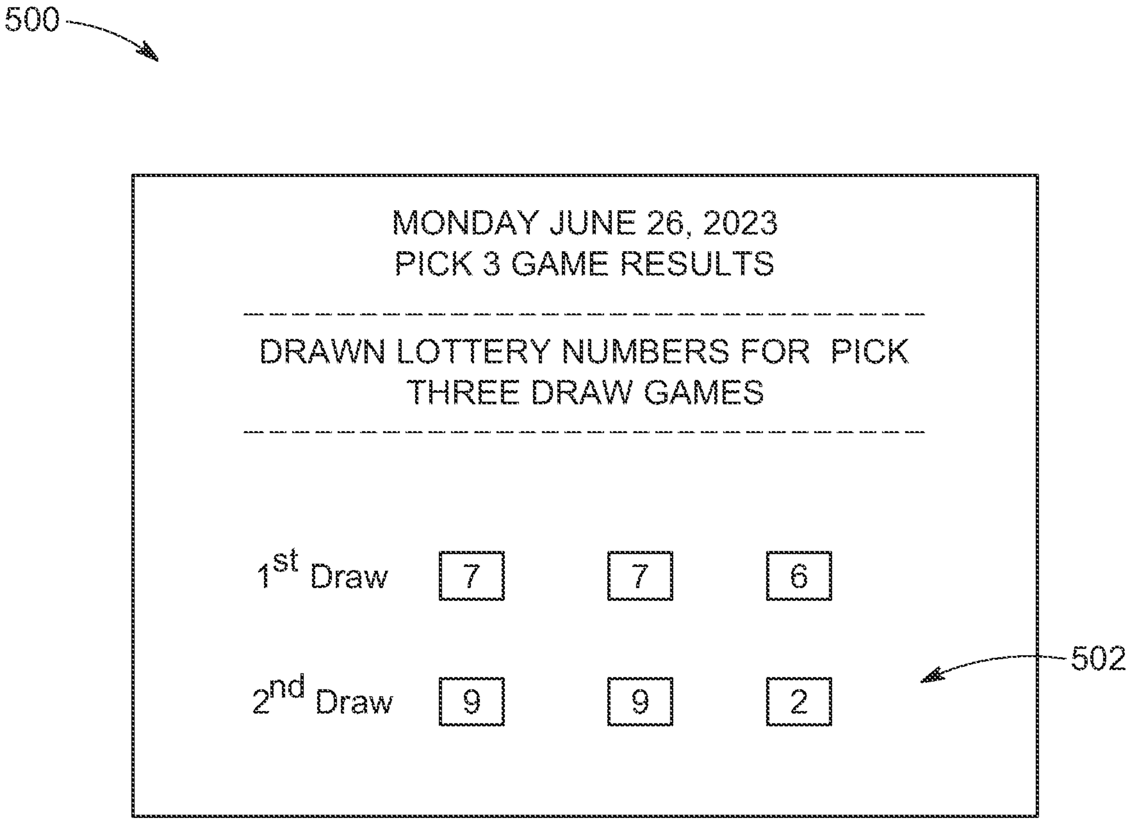
FIG. 4 is a screen shot of a display of a set of drawn lottery numbers for the drawings of two draw lottery games provided by a lottery system of one example embodiment of the present disclosure.

FIG. 4 illustrates a display device 500 displaying example sets of drawn lottery numbers 501 and 502 that are drawn for the drawings of the draw lottery games that are used for the multi-draw lottery game. In this example embodiment, the set of drawn lottery numbers 501 includes the drawn lottery numbers for the first drawing of the draw lottery game and the set of drawn lottery numbers 502 includes the drawn lottery numbers for the second drawing of the draw lottery game.

In this example illustrated embodiment, the lottery gaming system randomly selected: (a) the numbers 7 7 6 as drawn lottery numbers for the first drawing of the pick 3 draw lottery game; and (b) the numbers 9 9 2 as drawn lottery numbers for the second drawing of the pick 3 draw lottery game, which are used for the multi-draw lottery game.

In this example embodiment, after the lottery gaming system randomly selects the sets of drawn lottery numbers, the lottery gaming system can determine if any purchased lottery tickets are winning lottery tickets. The lottery gaming system can determine the sum of all of the drawn numbers in the drawings for the draw lottery game that are used for the multi-draw lottery game for this example illustrated lottery ticket 400. In this example, the sum is 40 (i.e., (7+7+6)+(9+9+2)). In this example, the lottery gaming system determines that an award is won for the play of the multi-draw lottery game because the player multi-draw sum is 40 and that corresponds to the sum of all of the drawn numbers for the first and second drawings of the draw lottery games. In this example, the lottery gaming system determines an award of $10,000 based on the exact match. When this lottery ticket 400 is redeemed, the lottery gaming system causes the award of $10,000 to be provided to the holder of the lottery ticket 400.

In this example embodiment, the draw lottery games that are used for the multi-draw lottery game are each a pick 3 draw lottery game. It should be appreciated that the draw lottery games can be any suitable draw lottery games such as but not limited to: (1) a pick 1 draw lottery game; (2) a pick 2 draw lottery game; (3) a pick 3 draw lottery game; (4) a pick 5 draw lottery game; or (5) a pick 6 draw lottery game. In other example embodiments, the draw lottery games that are used for the multi-draw lottery game can be two or more different draw lottery games.

2nd Example Embodiment

In a second example embodiment of the present disclosure, the multi-draw lottery game is based on draws of a pick 3 draw lottery game and a pick 4 draw lottery game.

Figure 5A:
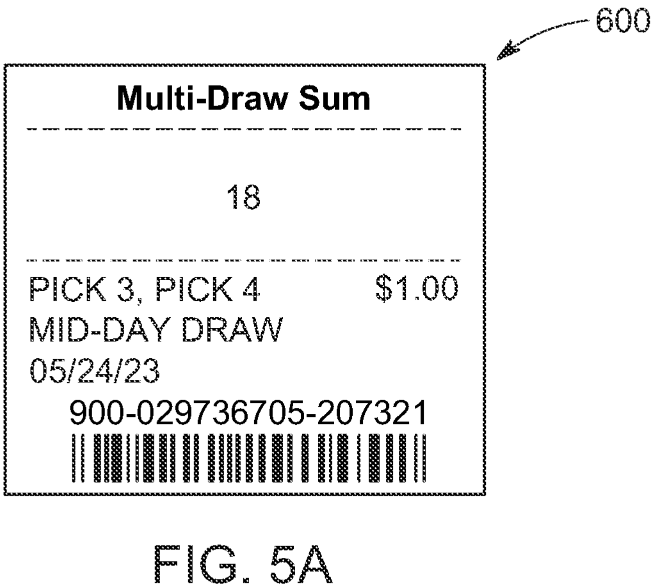
FIG. 5A is a front view of a lottery ticket for a play of a multi-draw lottery game provided by a lottery system of another example embodiment of the present disclosure.

FIG. 5A shows an example lottery ticket 600 for the multi-draw lottery game where the player multi-draw sum is 18, the player wager is $1.00, and the midday PICK 3 and PICK 4 draw lottery games are the draw lottery games that are used for the multi-draw lottery game.

Figure 5B:
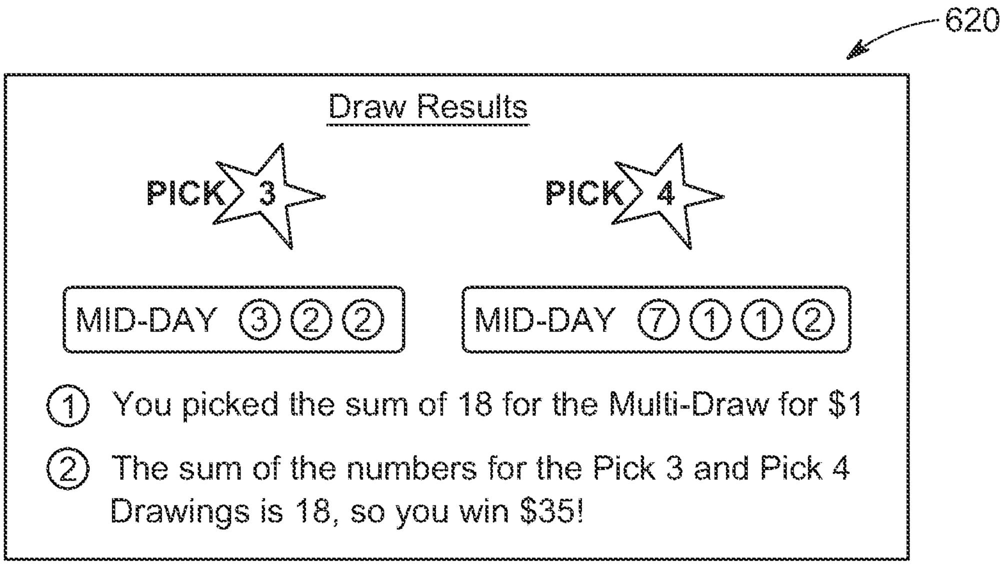
FIG. 5B is a chart showing the results of the play of the multi-draw lottery game for the lottery ticket of FIG. 5A.

FIG. 5B shows a display device displaying a display 620 of the drawn numbers for the midday PICK 3 and PICK 4 draw lottery games that are used for of the multi-draw lottery game. In this example, the drawn numbers are 3 2 2 for the PICK 3 draw lottery game and 7 1 1 2 for the PICK 4 draw lottery game. Thus, in this example the sum is 18 and the player multi-draw sum is 18. In this example, since the player multi-draw sum corresponds to the sum of the drawn numbers, and since the player wagered $1.00, the player is awarded $35 for this lottery ticket upon redemption based on a paytable (not shown) for the lottery ticket.

In alternative embodiments, the player can pick a specific sum range for the multi-draw lottery game. In other alternative embodiments, the player can pick either a specific sum for the multi-draw lottery game or a specific sum range for the multi-draw lottery game.

3rd Example Embodiment

In a third example embodiment of the present disclosure, the multi-draw lottery game is based on five drawings of a pick 1 draw lottery game.

Figure 6A:
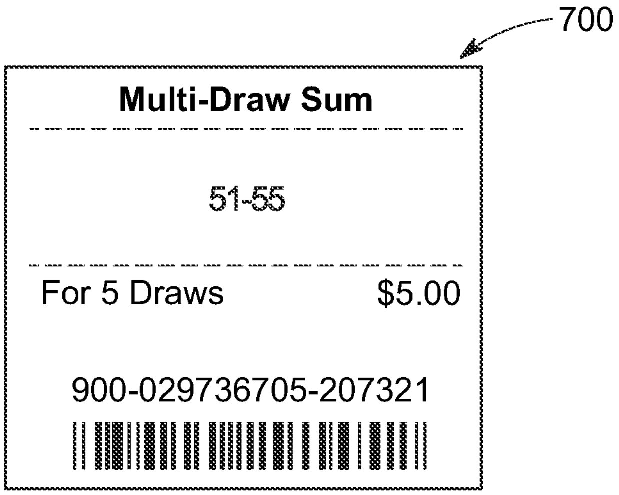
FIG. 6A is a lottery ticket for a play of a multi-draw lottery game provided by a lottery system of another example embodiment of the present disclosure.

FIG. 6A shows an example lottery ticket 700 for the multi-draw lottery game where the player multi-drawn sum is a range of 51-55, the player wager is $5.00, and the five pick 1 draw lottery games are the draw games for the multi-draw lottery game.

Figure 6B:
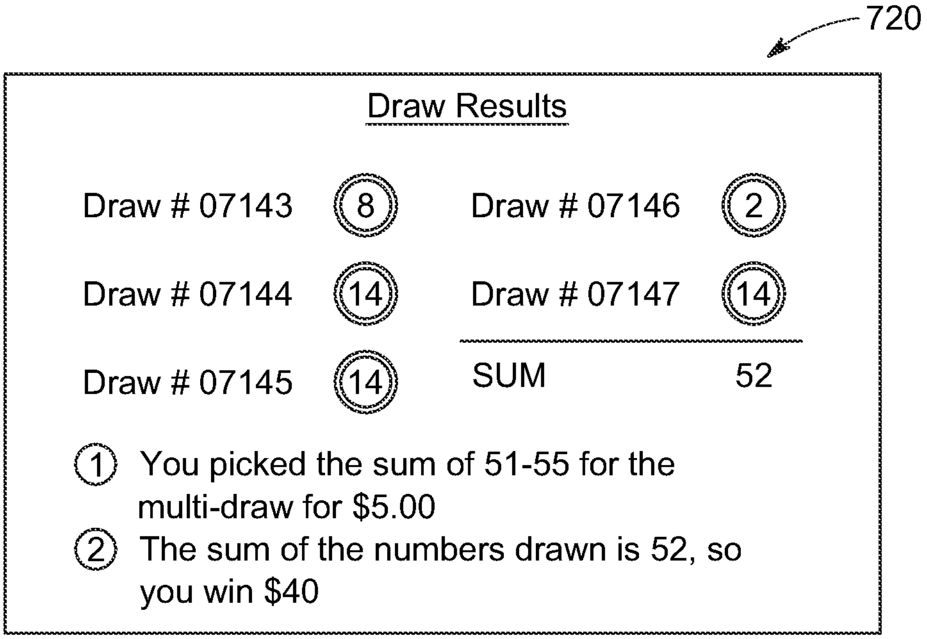
FIG. 6B is a chart showing the results of the play of the multi-draw lottery game for the lottery ticket of FIG. 6A.

FIG. 6B shows a display device displaying a display 720 of the drawn numbers for the five pick 1 draw lottery games. In this example, the drawn numbers are 15 for the first drawing of the draw lottery game, 14 for the second drawing of the draw lottery game, 7 for the third drawing of the draw lottery game, 2 for the fourth drawing of the draw lottery game, and 2 for the fifth drawing of the draw lottery game. Thus, in this example the sum is 52.

FIG. 6C shows the example paytable 750 for this multi-draw game. In this example, since the sum of 52 is within the range of the player multi-draw sum of 51-55, the player is awarded $40 for this lottery ticket upon redemption.

In alternative embodiments, the player can pick a specific sum for the multi-draw lottery game. In other alternative embodiments, the player can pick either a specific sum for the multi-draw lottery game or a specific sum range for the multi-draw lottery game.

4th Example Embodiment

In a fourth example embodiment of the present disclosure, the multi-draw lottery game is based on one drawing of a pick 4 draw lottery game. In this example, the sum is based on all of the numbers of the single draw of the draw lottery game. In certain such embodiments, the player can pick a specific sum for the multi-draw lottery game. In certain such embodiments, the player can pick a specific sum range for the multi-draw lottery game. In certain such embodiments, the player can pick either a specific sum for the multi-draw lottery game or a specific sum range for the multi-draw lottery game.

In alternative example embodiments, the lottery gaming system and can enable the player to wager one or more of the drawings of the underlying draw lottery game that are used for the multi-draw lottery game. This can include, for example, the lottery gaming system: (1) for two plays of a draw lottery game, determining a player number set of lottery numbers from a plurality of different numbers for each of the drawings of the draw lottery game; (2) determining a player multi-draw sum which is one of a plurality of different sum ranges for the play of the multi-draw lottery game; (3) receiving a purchase payment (that functions as a wager) for the lottery ticket from the player; (4) generating a lottery ticket including an indication of the determined player number sets and an indication of the determined player multi-draw sum; (5) storing data associated with the lottery ticket; (6) providing the player a paper copy and/or a virtual copy of the lottery ticket; (7) for each of the first and second plays of the draw lottery game, randomly determining a quantity of drawn lottery numbers; (8) determining any award for the first play of the draw lottery game based on a comparison on the player number set and the drawn numbers for the first play of the draw lottery game; (9) determining any award for the second play of the draw lottery game based on a comparison on the player number set and the drawn numbers for the second play of the draw lottery game; and (10) determining any award for the play of the multi-draw lottery game based on a determination of whether a sum of all of the plurality of drawn numbers for the first and second drawings of the draw lottery game that are used for the multi-draw lottery game correspond to the player multi-draw sum. The method also includes causing a payout to the player of any determined awards for the lottery ticket upon redemption of the lottery ticket. In this example, since the player multi-draw sum is a range, the correspondence is determined based one whether the sum of all of the plurality of drawn numbers for the first and second drawings plays of the draw lottery game is within the range of the player multi-draw sum.

In various embodiments, the numbers of the determined player number sets for the first and second drawings of the draw lottery games are selected by the player. In various embodiments, the numbers of the determined player number sets for the first and second drawings of the draw lottery games are randomly selected by the lottery system. In various embodiments, the numbers of the determined player number sets for the first and second drawings of the draw lottery games are randomly selected by the lottery system at the request of the player (such as via a quick pick).

In various example embodiments, the lottery gaming system determines any award for each play of the draw lottery game if the player number set of the lottery ticket for that play of the draw lottery game match each of the winning drawn lottery numbers for that play of the draw lottery game. That is, the lottery gaming system provides an award to a player if the player numbers match all of the drawn lottery numbers for that play of the draw lottery game. In other example embodiments, less than all of the numbers need to be matched for a play of the draw lottery game to result in an award.

It should be appreciated from the above, that various embodiments of the present disclosure provide a lottery gaming system configured to: (1) determine a player multi-draw sum for a play of a multi-draw lottery game, the player multi-draw sum comprising one of a plurality of different sums based on numbers that are selectable for each of a plurality of drawings of a draw lottery game that are used for the multi-draw lottery game; (2) generate a lottery ticket comprising an indication of the player multi-draw sum; (3) store data associated with the lottery ticket; (4) cause the lottery ticket to be provided to a player, the lottery ticket comprising a player multi-draw sum portion comprising an indication of the player multi-draw sum for the play of the multi-draw lottery game; (5) for each of a plurality of independent and separate drawings of the draw lottery game that are used for the play of the multi-draw lottery game, determine a quantity of drawn numbers for that drawing of the draw lottery game from a plurality of different numbers, the quantity of drawn numbers being at least one; (6) determine an award for the lottery ticket based on the player multi-draw sum and a total sum of the drawn numbers for all of the plurality of drawings of the draw lottery game that are used for the multi-draw lottery game; and (7) cause a display by a remote display device of an indication of the award. In various such embodiments, the player multi-draw sum is a single number. In various such embodiments, the player multi-draw sum is a range of numbers. In various such embodiments, the quantity of drawn numbers for each drawing of the draw lottery game that is used for the play of the multi-draw lottery game is more than one. In various such embodiments, the quantity of drawn numbers for each drawing of the draw lottery game that is used for the play of the multi-draw lottery game is the same. In various such embodiments, the quantity of drawn numbers for each of two drawings of the draw lottery game that are used for the play of the multi-draw lottery game are different. In various such embodiments, the plurality of independent and separate drawings of the draw lottery game that are used for the play of the multi-draw lottery game are sequential drawings of the draw lottery game. In various such embodiments, the display device is part of a mobile device. In various such embodiments, the display device is part of a lottery terminal.

It should further be appreciated from the above, that various embodiments of the present disclosure provide a lottery gaming system configured to: (1) determine a player multi-draw sum for a play of a multi-draw lottery game, the player multi-draw sum comprising one of a plurality of different sums that are based on a drawing of a first draw lottery game and a drawing of a different second draw lottery game that are used for the multi-draw lottery game; (2) generate a lottery ticket comprising an indication of the player multi-draw sum; (3) store data associated with the lottery ticket; (4) cause the lottery ticket to be provided to a player, the lottery ticket comprising a player multi-draw sum portion comprising an indication of the player multi-draw sum for the play of the multi-draw lottery game; (5) for each of independent and separate drawings of the first draw lottery game and the second draw lottery game that are used for the play of the multi-draw lottery game, determine drawn numbers for that drawing of the draw lottery game; (6) determine an award for the lottery ticket based on the player multi-draw sum and a sum of all of the drawn number for the drawings of the first draw lottery game and the second draw lottery game that are used for the multi-draw lottery game; and (7) cause a display by a remote display device of an indication of the award. In various such embodiments, the player multi-draw sum is a single number. In various such embodiments, the player multi-draw sum is a range of numbers. In various such embodiments, the quantity of drawn numbers for the drawing of the first draw lottery game is different than the quantity of drawn numbers for the drawing of the second draw lottery game. In various such embodiments, the first draw lottery game is a pick 3 draw lottery game, and the second draw lottery game is a pick 4 draw lottery game. In various such embodiments, the display device is part of a mobile device or part of a lottery terminal.

It should further be appreciated from the above, that various embodiments of the present disclosure provide a lottery gaming system configured to: (1) determine a player multi-draw sum for a play of a multi-draw lottery game, the player multi-draw sum comprising one of the plurality of different sum ranges; (2) generate a lottery ticket comprising an indication of the player multi-draw sum comprising one of the sum ranges; (3) store data associated with the lottery ticket; (4) cause the lottery ticket to be provided to a player, the lottery ticket comprising an indication of an indication of the player multi-draw sum for the play of the multi-draw lottery game; (5) for each of a plurality of independent and separate drawings of the draw lottery game that are used for the play of the multi-draw lottery game, determine a quantity of drawn numbers for that drawing of the draw lottery game from the plurality of different number, the quantity of drawn numbers being more than one; (6) determine an award for the lottery ticket based on the player multi-draw sum and a total sum of the drawn numbers for all of the drawings of the draw lottery game that are used for the play of the multi-draw lottery game; and (7) cause a display by a remote display device of an indication of the first award and the second award. In various such embodiments, the quantity of drawn numbers for each drawing of the draw lottery game is the same. In various such embodiments, the drawings of the draw lottery game that are used for the play of the multi-draw lottery game are sequential drawings of the draw lottery game. In various such embodiments, the draw lottery game is one of a pick 3 draw lottery game and a pick 4 draw lottery game. In various such embodiments, the display device is part of a mobile device or part of a lottery terminal.

It should be appreciated from the above, that the present disclosure improves lottery gaming technology and current lottery tickets in part by providing a new way for players to interact with the lottery gaming system, and new ways to win awards that are based on the winning outcomes of multiple separate and individual draw lottery games. It should further be appreciated from the above that the present disclosure improves lottery gaming technology in part by providing a new way to link draw lottery games through the lottery gaming system. It should further be appreciated from the above that the present disclosure improves lottery gaming technology in part by providing a new way to provide a winning outcome for an otherwise non-winning lottery ticket for a single draw game, and thus also a way to increase lottery ticket sales. It should further be appreciated from the above that the present disclosure improves lottery gaming technology in part by providing a new type of selection for a player to make for a lottery ticket, and thus also a way to increase lottery ticket sales. It should further be appreciated from the above that the present disclosure improves lottery gaming technology in part by providing new ways to provide different types of awards lottery tickets, and thus also a way to increase lottery ticket sales.

Example Lottery Gaming Systems—General

As mentioned above, in various embodiments, the lottery gaming system and method of the present disclosure are configured to be operated by a lottery agency (such as a state lottery agency).

As mentioned above, in various other embodiments, the lottery gaming system and method of the present disclosure are configured to be operated by a third party that runs the lottery for a lottery agency (such as a state lottery agency).

Figure 7:
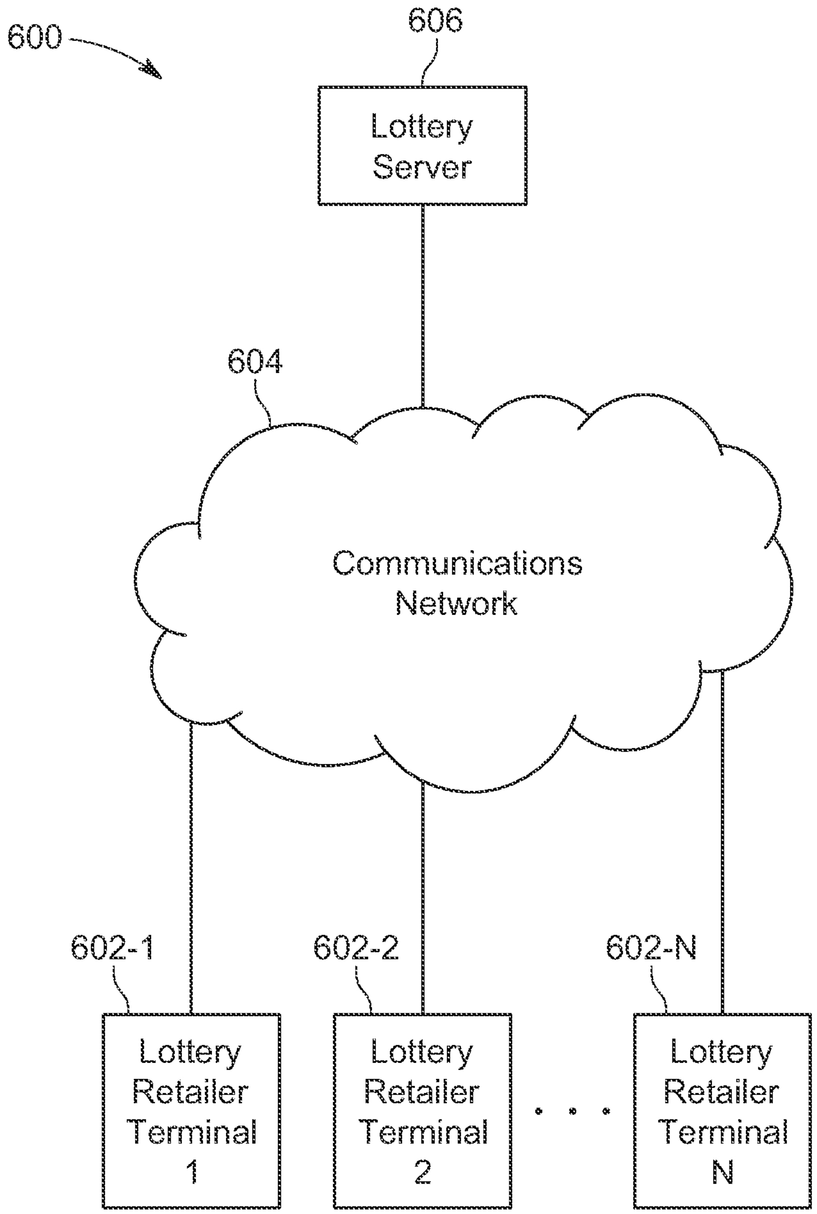
FIG. 7 is a schematic diagram of a lottery gaming system of one example embodiment of the present disclosure.

FIG. 7 illustrates an example networked lottery gaming system 600 for such implementation. This example network lottery gaming system 600 generally includes: (1) a plurality of lottery retailer terminals 602-1 to 602-N; (2) a communications network 604; and (3) one or more lottery servers such as lottery server 606. Generally, the retailer terminals 602-1 to 602-N and the lottery server 606 are configured to perform the functions described above and further described below.

In this example embodiment, each retailer terminal 602 corresponds to (or is associated with) a particular lottery retailer. For example, the first retailer terminal 602-1 of FIG. 7 may be associated with a first lottery retailer, such as a convenience store, and the second retailer terminal 602-2 of FIG. 7 may be associated with a second lottery retailer, such as a supermarket. It should be understood that any suitable quantity of lottery retailer terminals may be employed in the lottery gaming system 600, along with any suitable quantity of corresponding lottery servers 606.

In various example embodiments, the lottery retailer terminal 602 includes one or more processor(s). Generally, the processor is operative to perform or process instructions, and in particular, to operate in accordance with the various methods described herein. For example, the processor of the lottery retailer terminal 602 may be operable to enable the lottery retailer terminal 602 to transmit data to (and receive data from) the lottery server 606. More specifically, the processor may enable the transmission of data representing each lottery ticket.

In various example embodiments, the lottery retailer terminal 602 includes one or more input device(s). The input devices of the lottery retailer terminal 602 may include components such as an optical scanner and/or a barcode scanner, for reading and/or for deriving information associated with a playslip and/or a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of the lottery retailer terminal 602 may include a clock. The clock may be employed to detect, derive and/or append time and/or date information for use by the lottery server 606 to: (i) create a data record corresponding to lottery tickets purchased at the lottery retailer terminal 602, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, the lottery retailer terminal 602 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, the lottery retailer terminal 602 also includes one or more communications port(s), such as a serial port, a modem or the like. Generally, the communications port of the lottery retailer terminal 602 may be operable to facilitate two-way data communications between (i) the lottery retailer terminal 602, and (ii) the lottery server 606. In accordance with some embodiments, the communications port of the lottery retailer terminal 602 may operate to facilitate the transmission of information between the lottery retailer terminal and a player device such as a personal digital assistant (PDA), cell phone and/or a dedicated (e.g., a proprietary) device.

In various example embodiments, the lottery retailer terminal 602 includes a data storage device such as a hard disk, optical or magnetic media, random access memory (RAM) and/or read-only memory (ROM), or the like memory device. Generally, the data storage device of the lottery retailer terminal 602 stores a software program, the software program enabling a processor of the retailer terminal 602 to perform various functions including some or all of the various steps described herein. For example, in accordance with various embodiments, the lottery retailer terminal 602 may be configured to perform some or all of the functions of the lottery server 606 (and vice versa) such that the lottery server 606 and the lottery retailer terminal 602 may be considered as the same "device."

In various example embodiments, a lottery sales device may be utilized in place of a lottery retailer terminal 602. Such a lottery sales device may be implemented as a lottery server, a controller, a dedicated hardware circuit, an appropriately programmed general-purpose computer, or any other equivalent electronic, mechanical or electro-mechanical device. Thus, in various embodiments, a lottery sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery sales device may include any or all of the devices of the aforementioned systems.

In this example embodiment, the lottery server 606 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 606 includes one or more processor(s). Such a processor functions to process instructions, and in particular, to operate in accordance with various methods described herein. For example, the processor may operate to enable the lottery server 606 to transmit data to (and receive data from) the lottery retailer terminal 602. More specifically, the processor of the lottery server 606 may enable the transmission of data representing a lottery ticket, as well as information defining one or more payout(s) associated with that lottery ticket to or by a specific one of the lottery retailer terminals 602 shown in the lottery network 600 of FIG. 7. Thus, the lottery server 606 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 606 includes one or more input device(s). Examples of such input devices include a keypad, a mouse, a touch-screen, a random number generator, a microphone, and other digital or analog input devices.

In various example embodiments, the lottery server 606 also includes one or more output device(s). Example of output device(s) of the lottery server 606 include a monitor or other display for outputting information to an operator of the lottery server 606 (e.g., for displaying information such as statistical or sales data, win and loss information and/or payout amounts), a printer for producing a physical record (e.g., a report) of such data, and the like. In addition, the lottery server 606 may include one or more communications ports, such as a serial port, modem or the like, operable to facilitate two-way data communications between (i) the lottery server 606 and (ii) one or more lottery retailer terminals 602.

In various example embodiments, the lottery server 606 includes a data storage device (e.g., a hard disk or hard drive, a media-based (removable) memory, or the like). In certain embodiments, the data storage device of the lottery server 606 stores at least one software program, which includes a program to enable the processor of the lottery server 606 to perform some or all of the various steps and functions of at least one implementation of the methods described in detail herein. In addition, the data storage device of the lottery server 606 may operate to store one or more databases including a lottery ticket database and a lottery ticket redemption status database.

In various example embodiments, the lottery server 606 includes a lottery ticket server device that is located at a lottery ticket printing facility, and may also function to manage the ticket printing process. The lottery server 606 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 602-1) of FIG. 7 is configured to perform some or all of the functions of the lottery server 606. Thus, in certain example embodiments, the lottery server 606 and the retailer terminal (such as the first retailer terminal 602-1) (or another given retailer terminal and server pairing) may be considered as the same "device."

Generally, the communications network 604 of FIG. 7 includes one or more local and/or wide-area network(s) proprietary and/or public network(s) (e.g., the Internet) for facilitating two-way data communications between the retailer terminals 602 and the lottery server 606. The lottery server 606 may communicate with lottery retailer terminals 602 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 606, and communication between the lottery retailer terminals 602 and the lottery server 606 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a player multi-draw sum for a play of a multi-draw lottery game, the player multi-draw sum comprising one of a plurality of different sums based on numbers that are selectable for each of a plurality of drawings of a draw lottery game that are used for the multi-draw lottery game, wherein the player multi-draw sum is determined by optically scanning, via the optical scanner of the lottery terminal, a playslip comprising a player multi-draw sum selection portion, a wager indication portion, and a quick pick instruction portion, and wherein the playslip is either one of a paper playslip and a virtual playslip;

generating, via the processor, a lottery ticket comprising an indication of the player multi-draw sum;

storing data associated with the lottery ticket;

causing the lottery ticket to be provided to a player via one or both of a paper copy and a virtual copy, the lottery ticket comprising a player multi-draw sum portion comprising an indication of the player multi-draw sum for the play of the multi-draw lottery game;

for each of a plurality of independent and separate drawings of the draw lottery game that are used for the play of the multi-draw lottery game, randomly determining, via a random number generator, a quantity of drawn numbers for that drawing of the draw lottery game from a plurality of different numbers, the quantity of drawn numbers being at least one;

determining an award for the lottery ticket based on the player multi-draw sum and a total sum of the drawn numbers for all of the plurality of drawings of the draw lottery game that are used for the multi-draw lottery game; and causing a display, by a display device remote from the processor, of an indication of the award.

2. The method of claim 1, wherein the player multi-draw sum is a single number.

3. The method of claim 1, wherein the player multi-draw sum is a range of numbers.

4. The method of claim 1, wherein the quantity of drawn numbers for each drawing of the draw lottery game that is used for the play of the multi-draw lottery game is more than one.

5. The method of claim 1, wherein the quantity of drawn numbers for each drawing of the draw lottery game that is used for the play of the multi-draw lottery game is the same.

6. The method of claim 1, wherein the quantity of drawn numbers for each of two drawings of the draw lottery game that are used for the play of the multi-draw lottery game are different.

7. The method of claim 1, wherein the plurality of independent and separate drawings of the draw lottery game that are used for the play of the multi-draw lottery game are sequential drawings of the draw lottery game.

8. The method of claim 1, wherein the display device is part of a mobile device.

9. The method of claim 1, wherein the display device is part of the lottery terminal.

10. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a player multi-draw sum for a play of a multi-draw lottery game, the player multi-draw sum comprising one of a plurality of different sums that are based on a drawing of a first draw lottery game and a drawing of a different second draw lottery game that are used for the multi-draw lottery game, wherein the player multi-draw sum is determined by optically scanning, via the optical scanner of the lottery terminal, a playslip comprising a player multi-draw sum selection portion, a wager indication portion, and a quick pick instruction portion, and wherein the playslip is either one of a paper playslip and a virtual playslip;

generating, via the processor, a lottery ticket comprising an indication of the player multi-draw sum;

storing data associated with the lottery ticket;

causing the lottery ticket to be provided to a player via one or both of a paper copy and a virtual copy, the lottery ticket comprising a player multi-draw sum portion comprising an indication of the player multi-draw sum for the play of the multi-draw lottery game;

for each of independent and separate drawings of the first draw lottery game and the second draw lottery game that are used for the play of the multi-draw lottery game, randomly determining, via a random number generator, drawn numbers for that drawing of the draw lottery game;

determining an award for the lottery ticket based on the player multi-draw sum and a sum of all of the drawn numbers for the drawings of the first draw lottery game and the second draw lottery game that are used for the multi-draw lottery game; and causing a display, by a display device remote from the processor, of an indication of the award.

11. The method of claim 10, wherein the player multi-draw sum is a single number.

12. The method of claim 10, wherein the player multi-draw sum is a range of numbers.

13. The method of claim 10, wherein the quantity of drawn numbers for the drawing of the first draw lottery game is different than the quantity of drawn numbers for the drawing of the second draw lottery game.

14. The method of claim 10, wherein the first draw lottery game is a pick 3 draw lottery game, and the second draw lottery game is a pick 4 draw lottery game.

15. The method of claim 10, wherein the display device is part of a mobile device or part of the lottery terminal.

16. A method of operating a lottery gaming system comprising a lottery terminal comprising an optical scanner, a communications network, and a lottery server comprising a processor and a memory device that stores a plurality of instructions executable by the processor, the method comprising:

determining a player multi-draw sum for a play of a multi-draw lottery game, the player multi-draw sum comprising one of the plurality of different sum ranges, wherein the player multi-draw sum is determined by optically scanning, via the optical scanner of the lottery terminal, a playslip comprising a player multi-draw sum selection portion, a wager indication portion, and a quick pick instruction portion, and wherein the playslip is either one of a paper playslip and a virtual playslip;

generating a lottery ticket comprising an indication of the player multi-draw sum comprising one of the sum ranges;

storing data associated with the lottery ticket;

causing the lottery ticket to be provided to a player via one or both of a paper copy and a virtual copy, the lottery ticket comprising an indication of an indication of the player multi-draw sum for the play of the multi-draw lottery game;

for each of a plurality of independent and separate drawings of the draw lottery game that are used for the play of the multi-draw lottery game, randomly determining, via a random number generator, a quantity of drawn numbers for that drawing of the draw lottery game from the plurality of different number, the quantity of drawn numbers being more than one;

determining an award for the lottery ticket based on the player multi-draw sum and a total sum of the drawn numbers for all of the drawings of the draw lottery game that are used for the play of the multi-draw lottery game; and causing a display, by a display device remote from the processor, of an indication of the first award and the second award.

17. The method of claim 16, wherein the quantity of drawn numbers for each drawing of the draw lottery game is the same.

18. The method of claim 16, wherein the drawings of the draw lottery game that are used for the play of the multi-draw lottery game are sequential drawings of the draw lottery game.

19. The method of claim 16, wherein the draw lottery game is one of a pick 3 draw lottery game and a pick 4 draw lottery game.

20. The method of claim 16, wherein the display device is part of a mobile device or part of the lottery terminal.

* * * * *